| United States Patent [19] | [11] Patent Number: 4,926,435 |
| Kazan | [45] Date of Patent: May 15, 1990 |

[54] RADIOACTIVE LIGHT SOURCES

[76] Inventor: Benjamin Kazan, 557 Tyndall St., Los Altos, Calif. 94022

[21] Appl. No.: 234,924

[22] Filed: Aug. 22, 1988

[51] Int. Cl.⁵ ............................................. H01S 3/09
[52] U.S. Cl. ..................................... 372/73; 315/39; 372/69
[58] Field of Search ................... 372/1, 5, 69, 70, 73, 372/99, 92

[56] References Cited

U.S. PATENT DOCUMENTS

| 3,478,209 | 11/1969 | Feuer | 250/77 |
| 3,599,117 | 8/1971 | Willett . | |
| 3,772,609 | 11/1973 | Willett et al. | 372/1 |
| 4,137,509 | 1/1979 | Leone et al. | 372/1 |
| 4,166,252 | 8/1979 | Salzmann et al. | 372/1 |
| 4,213,052 | 7/1980 | Caffarella et al. | 250/462 |
| 4,247,800 | 1/1981 | Proud et al. | 315/39 |
| 4,313,911 | 2/1982 | Moran et al. | 250/303 |
| 4,641,315 | 2/1987 | Draggoo | 372/72 |
| 4,682,238 | 7/1987 | Kuppenheimer, Jr. | 372/72 |

OTHER PUBLICATIONS

A. Korin et al., "Parameters Affecting the Intensity of Light Sources Powered by Tritium", Nuclear Instruments and Methods, vol. 130, pp. 231–237, 1975.

G. F. Weston, "Cold Cathode Glow Discharge Tubes", Illife Books, pp. 157 and 210 (1968).

Primary Examiner—Léon Scott, Jr.
Attorney, Agent, or Firm—W. Douglas Carothers, Jr.

[57] ABSTRACT

A radioactive light source consists of a vacuum tight envelope filled with a mixture of a radioactive gas such as tritium with one or more other gases which luminesce when excited by the emission from the radioactive gas without the aid or requirement of any externally applied energy source, such as electrical power. This luminescence may be viewed through the wall of the chamber which may be transparent. Alternatively, all or a part of the luminescence may be converted to a different region of the spectrum by a suitable phosphor layer coated on the wall of the envelope.

16 Claims, 2 Drawing Sheets

4,926,435

RADIOACTIVE LIGHT SOURCES

BACKGROUND OF THE INVENTION

This invention relates to radioactive light sources and in particular to radioactive light sources that function to emit significant amounts of electromagnetic radiation without the aid of any externally applied energy source.

Light sources powered by radioactive sources have been known for many years. One of the early applications of such a source involved the use of luminescent coatings for watch dials and instrument panels in which the coating consisted of a radium compound admixed with a ZnS:Cu phosphor. See, for example, H. E. Leverenz, "An Introduction to the Luminescence of Solids", John Wiley and Sons, 1950. Aside from their health hazards, such luminescent sources are of limited utility because of their very low brightness which, for example, may be about 0.02 fL. For applications where larger area light sources of higher brightness are required, other means for generating the luminescence with the aid of a radioactive material has been studied. The most successful of these has involved the use of a radioactive gas, such as krypton-85 or tritium, whose beta ray emission excites a cathodo-luminescent phosphor exposed to the gas. During recent years such applications have mostly employed tritium because of the desirable energy range of its beta rays and the fact that it does not emit any penetrating radiation which would present a health hazard. Examples are U.S. Pat. No. 3,478,209 to Feuer relating to self luminous tritium light sources and U.S. Pat. No. 4,213,052 to Caffarella et al relating to radioactive light sources comprising a phosphor coated tube filled with tritium gas and such sources supplemented internally with radiation-to-voltage transducers.

In the usual arrangement, the light source consists of a glass tube whose inner surface is first coated with a layer of inorganic phosphor powder. Following this, tritium gas is admitted into the tube, which is then sealed off, providing a self contained light source requiring no external source of power to generate the light. Although the half-life of the tritium is sufficiently long for most practical purposes, about 12.3 years, a major limitation is the low brightness of such tubes. Unlike a suitable cathodoluminescent phosphor, such as ZnS, of optimized thickness and a tritium pressure of the order of 1 atmosphere, for example, the surface brightness produced is only about 1 fL. Although adequate for restricted applications, such as airport markers for night viewing, the brightness achieved is far below the level desired for many other applications.

To a large degree, the above limitation in brightness results from the fact that at useful pressures of tritium only beta rays (energetic electrons) originating from tritium atoms relatively close to the phosphor surface are effective in producing the light, since beta rays produced by tritium atoms more distant from the phosphor are blocked by self absorption of other tritium atoms. In the case of air, for example, at atmospheric pressure, the average range of the beta rays is only about 0.5 mm. In this connection, see the article of A. Korin et al entitled, "Parameters Affecting the Intensity of Light Sources Powered by Tritium", *Nuclear Instruments and Methods, Vol.* 130, pp 231-237, 1975. Although, to some degree, a higher brightness can be obtained by increasing the tritium pressure to increase the density of data rays in the vicinity of the phosphor, this is counteracted by the fact that beta ray from a correspondingly thinner layer of tritium can reach the phosphor. In principle, an alternative method for increasing the brightness would be to provide a stack of multiple phosphor layers on separate substrates separated a small distance from each other within a tritium filled chamber so that the light generated at each layer can be viewed through the layers behind it. Unfortunately, because of light absorption and light scattering in the phosphor layers, only a limited gain in brightness can be achieved in such a scheme.

It is an object of this invention to make more effective use of the beta emission from tritium by mixing with it a luminescent gas which can be excited throughout its volume by the emitted beta rays. Since such a gas mixture can be totally transparent, light generated at all depths will reach the surface of the tube, producing a substantial brightness from a tube containing a given volume of tritium.

SUMMARY OF THE INVENTION

According to this invention, a radioactive light source consists of a vacuum-tight envelope filled with a radioactive gas such as tritium mixed with one or more other gases which luminesce when exited by the emission from the radioactive gas without the aid or requirement of any externally applied power. This luminescence may be viewed through the wall of the chamber which is transparent to this radiation. Alternatively, all or part of the luminescence produced may be converted to a different region of the spectrum by a suitable phosphor layer coated on the inner or outer surface of the envelope wall.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 1:
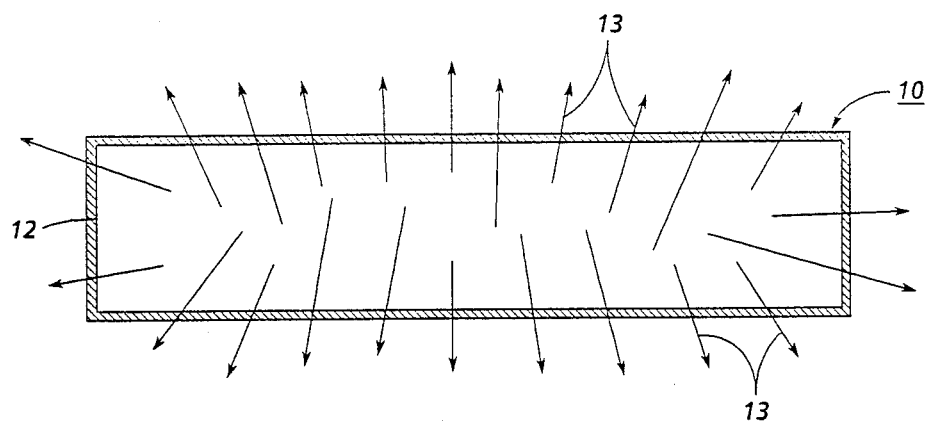
FIG. 1 is a longitudinal cross sectional view of a radioactive light source incorporating the principles of this invention.

As shown in FIG. 1, a tube 10 of glass or other supportive material is evacuated and its chamber 12 filled with a mixture of a radioactive gas and one or more luminescent gases and then hermetically sealed. The radioactive gas may emit, for example, alpha rays, beta rays or gamma rays. Since the radioactive gas and the other gases are intimately mixed together on a molecular level, visible light produced by these other gases as a result of emission from the radioactive gas is created uniformly throughout the gas volume. Also, since there is essentially no absorption of this light, all of it can escape from tube 10 without attenuation, irrespective of the depth of its origin as indicated by arrows 13 in FIG. 1. Tritium, for example, may be used as the radioactive gas since this emits energetic electrons (beta rays) with a wide range of energies from about zero to 19.5 kev. Mixed with this radioactive gas may be an inert gas, e.g., neon, helium or xenon, or a combination of such gases or other gases such a mercury vapor, which gases are responsive to the emission from the radioactive gas. From the technology of electrically-powered, gas-discharge light sources, it is well known that energetic electrons accelerated by an applied field which strike the atoms of each inert gases can excite them to produce luminescence. Tube 10 of FIG. 1, however, differs in that prior art involved trace amounts of a radioactive gas, e.g., tritium, were included with such another gas and the former function as an aid in the ignition of the light source operated via an externally applied energy source whereas in this invention, comparatively larger amounts of a radioactive gas are mixed with one or more other such gases and the radioactive gas per se excites the other gas to emit electromagnetic radiation throughout the gas volume in tube 10 without the aid of an externally applied energy source.

Although the partial pressures of the various gases can be varied over wide limits, it is preferable to adjust the pressures so that most of the electrons emitted from the tritium atoms are effective in exciting the luminescent gas rather than dissipating their energy by collision with other tritium atoms. In effect, this requires that each molecule of the radioactive gas be surrounded by a large number of molecules of the luminescent gas. However, to otain a high light level, a sufficient concentration or pressure of radioactive gas molecules must also be provided. Assuming the total pressure in tube 10 to be limited, for example, to a few atmospheres because of mechanical strength problems, a partial pressure of a few tenths of an atmosphere of radioactive gas can provide an adequate supply of beta rays for obtaining an acceptable level of brightness. Using a higher partial pressure of tritium, much higher brightness can also be obtained employing the same pressure of luminescent gas but at a somewhat lower efficiency of use of the radioactive gas. For practical purposes, it is assumed that the partial pressure of the radioactive gas should be 5% or more compared to the partial pressure of the luminescent gas or gases.

It should be noted that the use of a radioactive gas such as tritium mixed with one or more other luminescent gases has long been known. As discussed in the book, "Cold Cathode Glow Discharge Tubes" by G. F. Weston, London ILIFFE Books, 1968, a trace amount of tritium is added to these gases to insure the rapid initiation of an electrical discharge when voltage is applied between two electrodes inserted into a tube containing, for example, a neon-argon gas mixture at a pressure of 20 Torr. Since only a few microcuries of radioactive gas is added in such tubes, negligible light is produced by the addition of the tritium. In fact, no light emission is desired in such tubes in the absence of an applied voltage since they are intended for use as electronically-addressed switches or light sources. By contrast to this, in the present invention the concentration of the radioactive gas and the choice of luminescent gases is made to maximize the light output in the absence of any externally supplied energy, such as provided by an applied voltage source.

Figure 2:
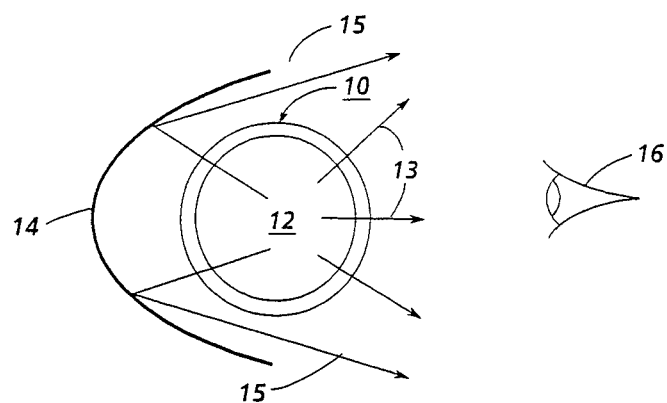
FIG. 2 is a lateral cross sectional view of the radioactive light source shown in FIG. 1 in combination with a reflector.
Figure 3:
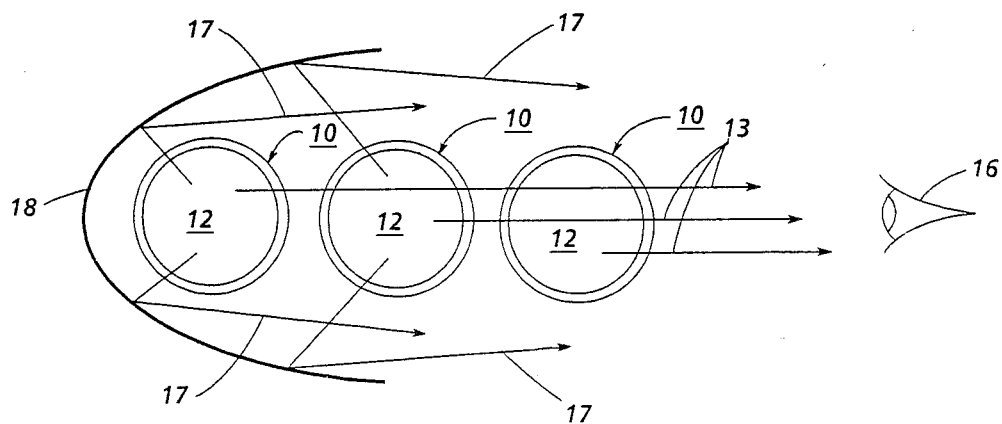
FIG. 3 schematically illustrates a plurality of radioactive light sources in combination with a reflector.

Since tube 10 in FIG. 1 will emit light in all directions, it may be desirable for certain applications to provide a reflective surface either as a coating on the inner or outer surface of a selected portion of the tube or as an external reflector 14, as illustrated in FIG. 2, to redirect toward an observer 16 any light emitted toward the rear, as indicated by arrows 15. To further enhance the level of brightness, a plurality of light emitting tubes 10, encompassed by a reflector 18 to direct reflected light (arrows 17) toward observer 16, may be arranged as shown in FIG. 3 so that observer 16 can see a superposition of the combined light from all of the tubes. Such an increase in brightness is possible since the gas filling of all of tubes 10 is essentially transparent to the light which is emitted from the tubes.

By comparison, it should be noted that such a method for increasing the brightness is not possible with conventional radioactive light sources employing a phosphor coating on the wall as the sole means for converting the radioactive emission to light. In these arrangements, the phosphor layers must be sufficiently thick to absorb the emission energy from the radioactive gas Such phosphor layer thus may scatter and absorb a significant amount of light. An attempt to view the light from one tube which also passes through another tube would thus result in increased light losses and negate the advantage of using a stack of multiple tubes 10 such as illustrated in FIG. 2.

Figure 4:
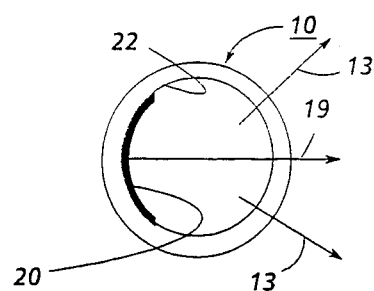
FIG. 4 is a lateral cross sectional view of the radioactive light source containing a phosphor layer on a portion of the surface of its interior wall.

For increasing the light output and modifying its spectral distribution, tubes 10 shown in FIGS. 1 and 2 may be modified, as shown in FIG. 4, to include a phosphor layer 20 on the rear wall 22, which phosphor will convert a portion of the emission from the radioactive gas to visible light, as represented by arrow 19. An observer will then see the superposition of light produced from phosphor layer 20 as well as the light generated throughout the gas volume of tube 10 generated by the luminescent gases.

Figure 5:
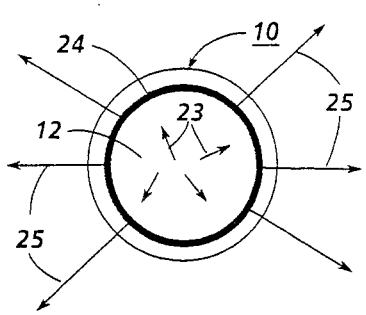
FIG. 5 is a lateral cross sectional view of the radioactive light source containing a phosphor layer on the surface of its interior wall.

Although it has been assumed that the luminescent gases emit light in the visible portion of the spectrum, gases may be chosen which emit at other wavelengths of electromagnetic radiation. For example, if a luminescent gas such as xenon is used, aside from some visible light, a large fraction of the emission may be in the ultraviolet. In this case, it may be desirable to coat a portion or the entire inner surface of the glass tube with an efficient photoluminescent phosphor which converts the ultraviolet radiation to visible light. Phosphor may, in addition, be excited by direct excitation from the radioactive gas. A structure of this type is illustrated in FIG. 5 wherein tube 10 has its inner surface coated with a photoluminescent phosphor 24. Ultraviolet light, represented by arrows 23, emitted from a radioactive excited gas in chamber 12 will be converted by phosphor 24 to light in the visible spectrum, which is represented by arrows 25. alternatively, if the tube walls are made of a material such as quartz which transmits ultraviolet radiation efficiently, the phosphor 24 may be coated on the outer surface of tube 10.

Figure 6:
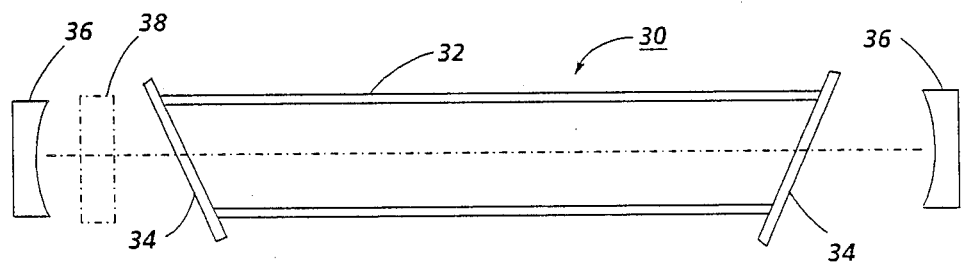
FIG. 6 is a schematic illustration of an embodiment of this invention utilized as a laser device.

A further embodiment of the invention is shown in FIG. 6. Radioactive light source 30 comprises a laser having an elongated tube 32 filled with a mixture of a radioactive gas and other luminescent gases to produce light emission in the manner explained in connection with FIG. 1. As in the case of electrically excited gas lasers, if tube 32 is sufficiently long and is provided with Brewster windows 34 at both ends, laser action will occur if external mirrors 36 are suitably positioned in proper axial position at both ends of tube 32. If mirrors 36 are partially transparent, a portion of the laser emission from ends 34 of tube 32 will then be transmitted through mirrors 36 for general purpose usage. Possible gases for use with laser 30 would be helium, neon, argon or krypton mixed with a radioactive gas such as tritium. Unlike conventional gas lasers which are electrically powered via electrodes in contact with the gas, laser 30 shown in FIG. 5 will remain in continuous operation due to the continued emission of beta rays from the radioactive gas. To interrupt the lasing action, a light absorber or electronically-controlled light value, represented by dotted outline 38, may be interposed between the end of tube 32 and one of the mirrors 36 to reduce the gain below the threshold required for lasing action.

In addition to the forgoing embodiments, at least one pair of electrodes may be provided in the confines of tube 10 to provide further enhanced emission upon application of electrical power.

While the invention has been described in conjunction with a few specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. In a radioactive light source comprising a vacuum tight envelope having a chamber containing a radioactive gas medium which emits beta rays, at least one other gas medium disposed in said chamber, the partial pressure of said radioactive gas intermixed with said other gas medium, sufficent to excite said other gas medium and generate continuous and substained electromagnetic radiation, effectively utilizing the limited range of said beta rays, the partial pressure of the radioactive gas medium being 5% or more compared to the partial pressure of said other gas medium.

2. The radioactive light source of claim 1 wherein the walls of said chamber are transparent to at least a portion of said electromagnetic radiation to permit transmission of said radiation outside of said chamber.

3. The radioactive light source of claim 1 which includes a reflective surface provided internally or externally of said chamber to reflect said radiation in a selected direction away from said source.

4. The radioactive light source of claim 3 which includes a plurality of said light sources aligned one behind the other to produce an enhanced brightness in a preferred direction.

5. The radioactive light source of claim 1 wherein at least a portion of the walls of said chamber are coated with a phosphor which luminesces when excited by said radioactively excited gas.

6. The radioactive light source of claim 1 in which the spectrum of the electromagnetic radiation emitted by said radioactively excited gas is at least partially outside the visible region of said spectrum.

7. The radioactive light source of claim 1 wherein a photoluminescent phosphor is coated on at least a portion of the walls of said chamber to convert the electromagnetic radiation emitted from said gas mixture to another portion of the spectrum.

8. The radioactive light source of claim 1 wherein a photoluminescent phosphor is coated on external surfaces of said envelope, said envelope transparent to said electromagnetic radiation.

9. The radioactive light source of claim 1 wherein said radioactive gas comprises tritium and said other gas medium selected from the group consisting essentially of helium, neon, argon, krypton and mercury vapor, the partial pressure of said tritium being 5% or more of the total pressure in said chamber.

10. In a radioactive light source comprising a hermetically sealed container transparent to electromagnetic radiation.

a radiactive gas which emits beta rays in said container, at least one other gas which can be excited to produce luminescence in said container, said radioactive gas having sufficient partial pressure in said container so that the interaction of said gases within said container produces continuous and substained luminescence as a result of internal excitation of said luminescent gas by said beta rays there by effectively utilizing the limited range of said beta rays to excite said luninescent gas, the partial pressure of the radioactive gas being 5% or more compared to the partial pressure of the luminescent gas.

11. The radioactive light source of claim 10 wherein said radioactive gas comprises tritium gas and said luminescent gas comprises helium, neon, argon, krypton or xenon or mercury vapor or combinations thereof.

12. The radioactive light source of claim 11 wherein at least a portion of the inner wall of said container is coated with photoluminescent phosphor.

13. The radioactive light source of claim 10 wherein the partial pressures of said radioactive gases and said luminescent gas are optimized so that a maximum of the emission energy from the radioactive atoms is effective in exciting said luminescent gas, said effective optimization determined by the pressure of said luminescent gas being made sufficiently high so that most of the beta ray energy emitted by the radioactive gas is absorbed in said luminescent gas.

14. The radioactive light source of claim 13 wherein said radioactive gas comprises tritium gas, the partial pressure of said tritium gas is 5% or more of the total gas pressure in said container.

15. The radioactive light source of claim 14 which includes means for applying an external power source to enhance the light emission from said source.

16. In a gas laser having a chamber containing a gaseous laser medium intermixed with a radioactive beta-ray-emitting gas of sufficient partial pressure to provide the pumping energy for said laser medium via said beta ray emission to uniformly generate electromagnetic radiation through said laser medium, effectively utilizing the limited range of said beta rays to pump said laser medium and means to provide feedback of said radiation to sustain stimulated emission of said laser medium.

* * * * *